US009558256B2

(12) United States Patent
Vaillant et al.

(10) Patent No.: US 9,558,256 B2
(45) Date of Patent: Jan. 31, 2017

(54) MIDDLEWARE DATA LOG SYSTEM

(75) Inventors: Jean-Luc Vaillant, Saratoga, CA (US); Chavdar Botev, Sunnyvale, CA (US); Shirshanka Das, San Jose, CA (US); Bhaskar Ghosh, Palo Alto, CA (US); Lei Gao, San Ramon, CA (US); Mitch Stuart, San Jose, CA (US); Kapil Surlaker, Sunnyvale, CA (US); Jemiah Westerman, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 636 days.

(21) Appl. No.: 13/296,894

(22) Filed: Nov. 15, 2011

(65) Prior Publication Data
US 2012/0215740 A1   Aug. 23, 2012

Related U.S. Application Data
(60) Provisional application No. 61/414,364, filed on Nov. 16, 2010.

(51) Int. Cl.
*G06F 7/00* (2006.01)
*G06F 17/00* (2006.01)
*G06F 17/30* (2006.01)

(52) U.S. Cl.
CPC ............... *G06F 17/30578* (2013.01)

(58) Field of Classification Search
CPC ............ G06F 17/30; G06F 17/30578; G06F 17/30224; G06F 17/30368; G06F 17/30581; G06F 17/30227
See application file for complete search history.

(56) References Cited

U.S. PATENT DOCUMENTS

| | | | |
|---|---|---|---|
| 7,158,985 B1* | 1/2007 | Liskov | |
| 7,730,099 B2* | 6/2010 | George et al. | 707/796 |
| 2005/0259572 A1* | 11/2005 | Esfahany et al. | 370/217 |
| 2005/0283492 A1* | 12/2005 | Schmitt et al. | 707/100 |
| 2006/0200501 A1* | 9/2006 | Holenstein et al. | 707/202 |
| 2009/0300073 A1* | 12/2009 | Bourbonnais et al. | 707/202 |
| 2010/0238801 A1* | 9/2010 | Smith et al. | 370/229 |
| 2010/0250491 A1* | 9/2010 | Jin et al. | 707/634 |

OTHER PUBLICATIONS

"Exploiting Distributed Version Concurrency in a Transactional Memory Cluster" Kaloian Manassiev, Madalin Mihailescu, & Cristiana Amza (2006).*

* cited by examiner

*Primary Examiner* — Azam Cheema
(74) *Attorney, Agent, or Firm* — Schwegman Lundberg & Woessner, P.A.

(57) ABSTRACT

A method of maintaining a data store is disclosed. The data store is distributed across a plurality of storage provider instances, including a master storage provider instance and a plurality of additional storage provider instances. A master data log is updated to reflect a change to the data store. The master data log is synchronized with a plurality of replicas of the master data log. The change is propagated across the plurality of additional storage provider instances based on an analysis of the replicas.

18 Claims, 13 Drawing Sheets

| DATA SOURCE TYPE | WRITE OPERATION | ASSERTS / RESOLVES | DCRS |
|---|---|---|---|
| DATA SOURCE D W/O SECONDARY INDEXES | INSERT(K, V) | - ASSERT KEY K DOES NOT EXIST IN D | DCR_INSERT(I, K, NULL, V) |
| DATA SOURCE D W/O SECONDARY INDEXES | UPDATE(K, V) | - ASSERT KEY K EXISTS IN D<br>- RESOLVE OLD VALUE V' OF K IN D | DCR_UPDATE(I, K, V', V) |
| DATA SOURCE D W/O SECONDARY INDEXES | DELETE(K) | - ASSERT KEY K EXISTS IN D<br>- RESOLVE OLD VALUE V' OF K IN D | DCR_DELETE(I, K, V', NULL) |
| DATA SOURCE D W/O SECONDARY INDEXES | UPSERT(K, V) | - RESOLVE IF K EXISTS OR NOT IN D<br>- RESOLVE OLD VALUE V' IF K EXISTS | - DCR_UPDATE(I, K, V', V) IF K EXISTS<br>- DCR_INSERT(I, K, NULL, V) IF K DOES NOT EXIST |
| DATA SOURCE D W/ A NON-UNIQUE SECONDARY I ON COLUMN C | INSERT(K, V) | - ASSERT KEY K DOES NOT EXIST IN D | DCR_INSERT(I, K, NULL, V); DCR_INSERT(I, V[C], NULL, K) |
| DATA SOURCE D W/ A NON-UNIQUE SECONDARY I ON COLUMN C | UPDATE(K, V) | - ASSERT KEY K EXISTS IN D<br>- RESOLVE OLD VALUE V' OF K IN D | DCR_UPDATE(I, K, V', V); DCR_DELETE(I, V'[C], K, NULL); DCR_INSERT(I, V[C], NULL, K) |
| DATA SOURCE D W/ A NON-UNIQUE SECONDARY I ON COLUMN C | DELETE(K) | - ASSERT KEY K EXISTS IN D<br>- RESOLVE OLD VALUE V' OF K IN D | DCR_DELETE(I, K, V', NULL); DCR_DELETE(I, V'[C], K, NULL) |
| DATA SOURCE D W/ A NON-UNIQUE SECONDARY I ON COLUMN C | UPSERT(K, V) | - RESOLVE IF K EXISTS OR NOT IN D<br>- RESOLVE OLD VALUE V' IF K EXISTS | - DCR_UPDATE(I, K, V', V); DCR_DELETE(I, V'[C], K, NULL); DCR_INSERT(I, V[C], NULL, K) IF K EXISTS<br>- INSERT(I, K, NULL, V); DCR_INSERT(I, V[C], NULL, K) IF K DOES NOT EXIST IN D |
| DATA SOURCE D W/ A UNIQUE SECONDARY I ON COLUMN C | INSERT(K, V) | - ASSERT KEY K DOES NOT EXIST IN D<br>- ASSERT V[C] DOES NOT EXIST IN I | DCR_INSERT(I, K, NULL, V); DCR_INSERT(I, V[C], NULL, K) |
| DATA SOURCE D W/ A UNIQUE SECONDARY I ON COLUMN C | UPDATE(K, V) | - ASSERT KEY K EXISTS IN D<br>- ASSERT V[C] DOES NOT EXIST IN I<br>- RESOLVE OLD VALUE V' | DCR_UPDATE(I, K, V', V); DCR_DELETE(I, V'[C], K, NULL); DCR_INSERT(I, V[C], NULL, K) |
| DATA SOURCE D W/ A UNIQUE SECONDARY I ON COLUMN C | DELETE(K) | - ASSERT KEY K EXISTS IN D<br>- RESOLVE OLD VALUE V' | DCR_DELETE(I, K, V', NULL); DCR_DELETE(I, V'[C], K, NULL) |
| DATA SOURCE D W/ A UNIQUE SECONDARY I ON COLUMN C | UPSERT(K, V) | - ASSERT V[C] DOES NOT EXIST IN I<br>- RESOLVE IF K EXISTS OR NOT<br>- RESOLVE VALUE V' IF K EXISTS | - DCR_UPDATE(I, K, V', V); DCR_DELETE(I, V'[C], K, NULL); DCR_INSERT(I, V[C], NULL, K) IF K EXISTS<br>- INSERT(I, K, NULL, V); DCR_INSERT(I, V[C], NULL, K) IF K DOES NOT EXIST |

FIG. 11

MIDDLEWARE DATA LOG SYSTEM

CROSS REFERENCE TO RELATED APPLICATIONS

This application claims the benefit of U.S. Provisional Application No. 61/414,364, filed Nov. 16, 2010, entitled "MIDDLEWARE DATA LOG SYSTEM," which is incorporated herein by reference in its entirety.

TECHNICAL FIELD

The present application relates generally to the technical field of data storage and, in one specific example, to using a data log to maintain multiple instances of a data store across multiple instances of different data storage providers.

BACKGROUND

For consumer-facing websites, having a scalable system to handle increasing user traffic is often important. Traditionally, data is stored persistently in a relational database system (RDMS) and cached in a multi-tier or multi-layer software system for fast serving. Scaling the multi-tier software system is frequently a challenging and expensive proposition. For example, traditional systems may partition data over a set of nodes, allowing scalability to be achieved by adding nodes. Examples of such traditional systems include Amazon Dynamo and Platform for Nimble Universal Table Storage (PNUTS) of Yahoo!'s Sherpa data services platformi. Although distributing data over multiple nodes may simplify the data layer, this solution places additional responsibility on the application layer. Additionally, some traditional solutions sacrifice one or more properties that guarantee database transactions are processed reliably (e.g., atomicity, consistency, isolation, or durability) in favor of scalability. Furthermore, some traditional solutions depend on distributing the data across nodes that are homogenous, particularly in terms of the underlying storage technologies used by the nodes.

BRIEF DESCRIPTION OF THE DRAWINGS

Some embodiments are illustrated by way of example and not limitation in the figures of the accompanying drawings in which:

FIG. 11 is a table of example information upon which the master data access engine instance may base the generation of a DCR for addition to the master log;

DETAILED DESCRIPTION

Figure 1:
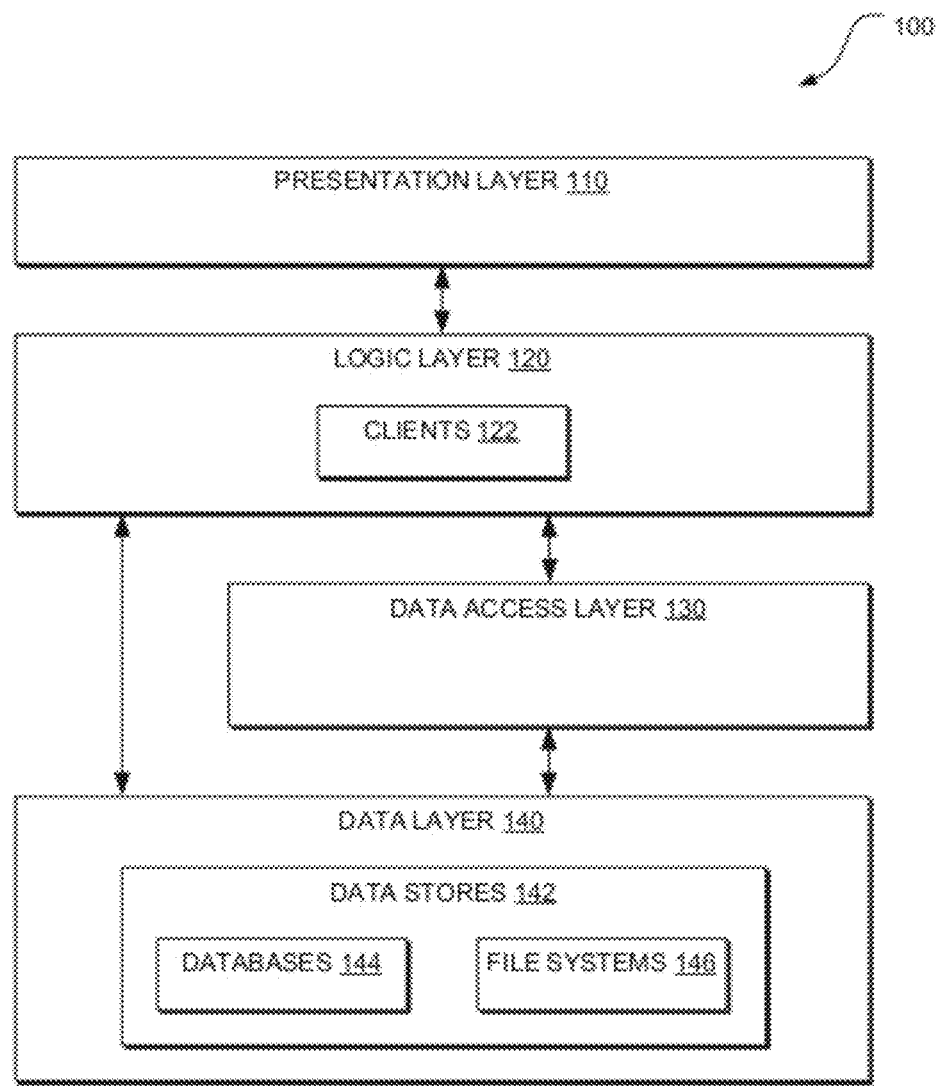
FIG. 1 is a block diagram depicting example layers of a multi-tier software application.

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

In a first embodiment of a system of maintaining a data store, a data layer of a multi-tier software application distributes the data store across a plurality of storage provider instances. The plurality of storage provider instances includes a master storage provider instance and a plurality of additional storage provider instances. A data access engine layer updates a master log to reflect a change to the data store, the master log being maintained by a master data access engine instance, the master data access engine instance being associated with the master storage provider instance. The data access engine layer synchronizes the master log with a plurality of replicas of the master log, each of the plurality of replicas being maintained by a respective one of a plurality of additional data access engine instances, each of the plurality of additional data access engine instances being associated with a respective one of the plurality of additional storage provider instances. The data access engine layer analyzes the replicas to propagate the change across the plurality of additional storage provider instances.

In a second embodiment of a system of maintaining a data store, a data access layer of a multi-tier software application receives a request to retrieve a data item from the data store. The data store is distributed across a plurality of storage provider instances, including a master storage provider instance and a plurality of additional storage provider instances. Additionally, the master storage provider instance is associated with a master data access engine instance and the plurality of additional storage provider instances is associated with a plurality of additional data access engines. Furthermore, the master data access engine maintains a master data log and each of the plurality of additional data access engines maintains a respective one of a plurality of replicas of the master data log. The data access layer makes a determination that one of the plurality of data access engine instances is unable to process the request based on an analysis of the one of the plurality of replicas maintained by the one of the plurality of data access engine instances. In response to the determination, the data access layer processes the request with the master data access engine based on an analysis of the master data log.

FIG. 1 is a block diagram depicting example layers 100 of a multi-tier software application. The layers 100 include a presentation layer 110, a logic layer 120, a data access layer 130, and a data layer 140. The presentation layer 110 is configured to present an interface to a user. For example, the presentation layer 110 may present a user interface of an operating system on a client device to which the user has access. Alternatively, the presentation layer 110 may serve web pages to be rendered on the client device. The user interface may receive inputs from the user and display results of a processing of the inputs to the user. The presentation layer 110 is communicatively coupled to the logic layer 120.

The logic layer 120 is configured to process data. For example, the logic layer 120 may process commands, make logical decisions, make evaluations, or perform calculations. The logic layer 120 includes one or more clients 122. The clients 122 are configured to access the data store(s) 142 directly or via the data access layer 130. Thus, the logic layer 120 may be communicatively coupled to both the data access layer 130 and the data layer 140.

The data access layer 130 serves as middleware between the logic layer 120 and the data layer 140. As is described in further detail with respect to FIG. 3, the data access layer 130 provides functions to improve access to the data layer 140.

The data layer 140 is configured to store and retrieve data. The data layer 140 includes one or more data store(s) 142, which, in turn, include one or more database(s) 144 or one or more file system(s) 146. The data store(s) 142 may store any type of data (e.g., key-value pairs).

Data in the data store(s) 142 may be partitioned into one or more data domains. For example, data pertaining to a web site like LinkedIn may include data domains for members, forums, books, communications, jobs, and so on.

The layers 100 of the software application may be deployed on one or more software servers. For example, the presentation layer 110 may be configured to execute on a web server, the logic layer 120 and the data access layer 130 may be configured to execute on an application server, and the data layer 140 may be configured to execute on a database server.

Figure 2:
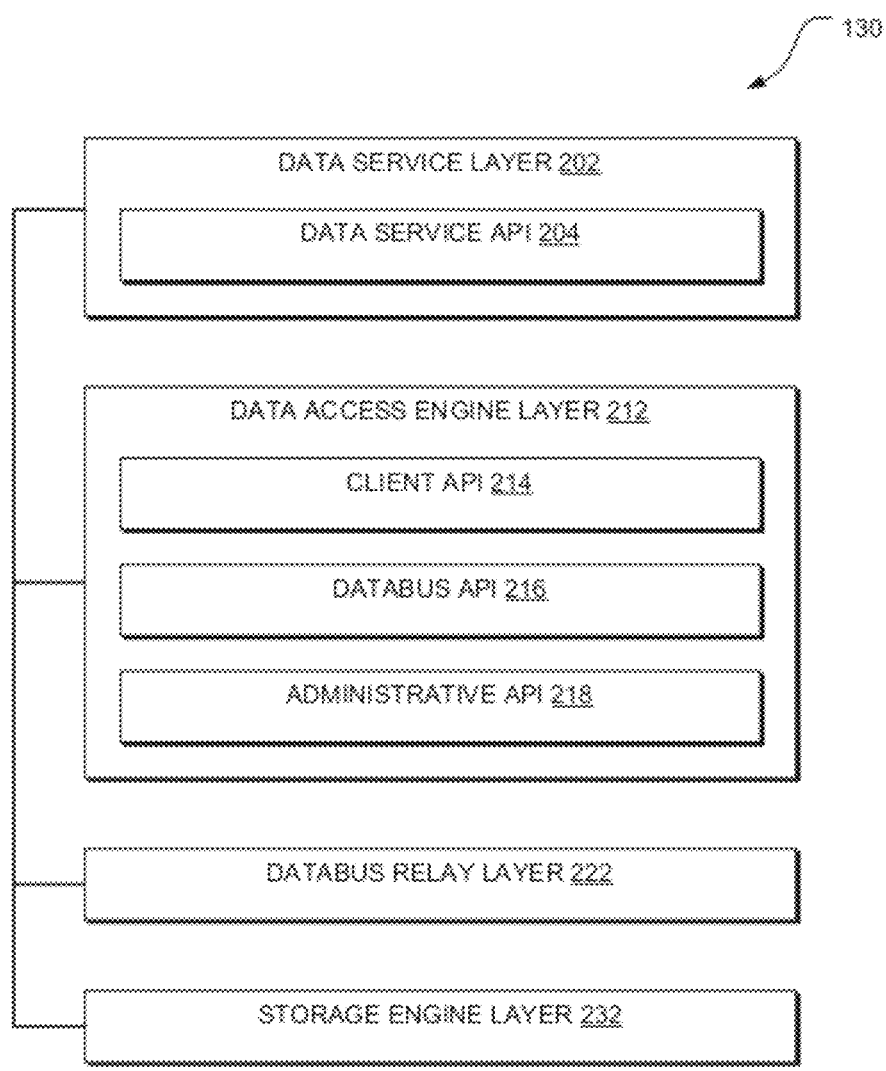
FIG. 2 is a block diagram depicting the data access layer of FIG. 1 in more detail.

FIG. 2 is a block diagram depicting the data access layer 130 of FIG. 1 in more detail. The data access layer 130 includes a data service layer 202, a data access engine (DAE) layer 212, a databus relay layer 222, and a storage engine layer 232. The data service layer 202 is configured to be an entry point for any read or write interaction with the data store(s) 142. For example, the data service layer 202 may include a data service API 204 that is configured to be invoked by the clients 122 to access the data store(s) 142. In various embodiments, the data service API 204 may be an API that is specific to a particular data domain. When it receives an access request from the client 122, the data service layer 202 may, in turn, invoke an API of the DAE layer 212 to handle the request.

The DAE layer 212 is configured to handle requests from the data service layer 202. The DAE layer 212 includes a client API 214, a databus API 216, and an administrative API 218. The client API 214 is configured to handle requests to read from and write to the data store(s) 142. The databus API 216 is configured to handle requests for information about events pertaining to the data store(s) 142. The administrative API 218 is configured to handle requests related to administering and monitoring the data store(s) 142. As is described in further detail below, the DAE layer 212 is configured to maintain a data log of changes to the data store(s) 142.

The data access layer 130 includes a databus relay layer 222 that is configured to relay information about events pertaining to the data store(s) 142. For example, the databus relay layer 222 may poll the DAE layer 212 for the information about the events (e.g., via the databus API 216). Then, the databus relay layer 222 may notify the storage engine layer 232 of the information it receives.

The storage engine layer 232 is configured to be the glue between the DAE layer 212 and the data layer 140. For example, the storage engine layer 232 may handle translations between the data-log-based data model of the DAE layer 212 and a key-value data model of a storage provider. As used herein, a storage provider is any technology that may be used to manage data storage. Examples of storage providers include MySQL, Oracle, BerkleyDB, and memcached. The storage providers may implement one or more properties that guarantee database transactions are processed reliably (e.g., atomicity, consistency, isolation, or durability). Additionally or alternatively, the storage providers may enable data storage caching. Such caching, may, for example, prevent the DAE layer 212 from having to query the storage engine layer 232 directly when data is stored in the cache. The storage providers may be oblivious to the log-based model of the DAE layer 212.

Figure 3:
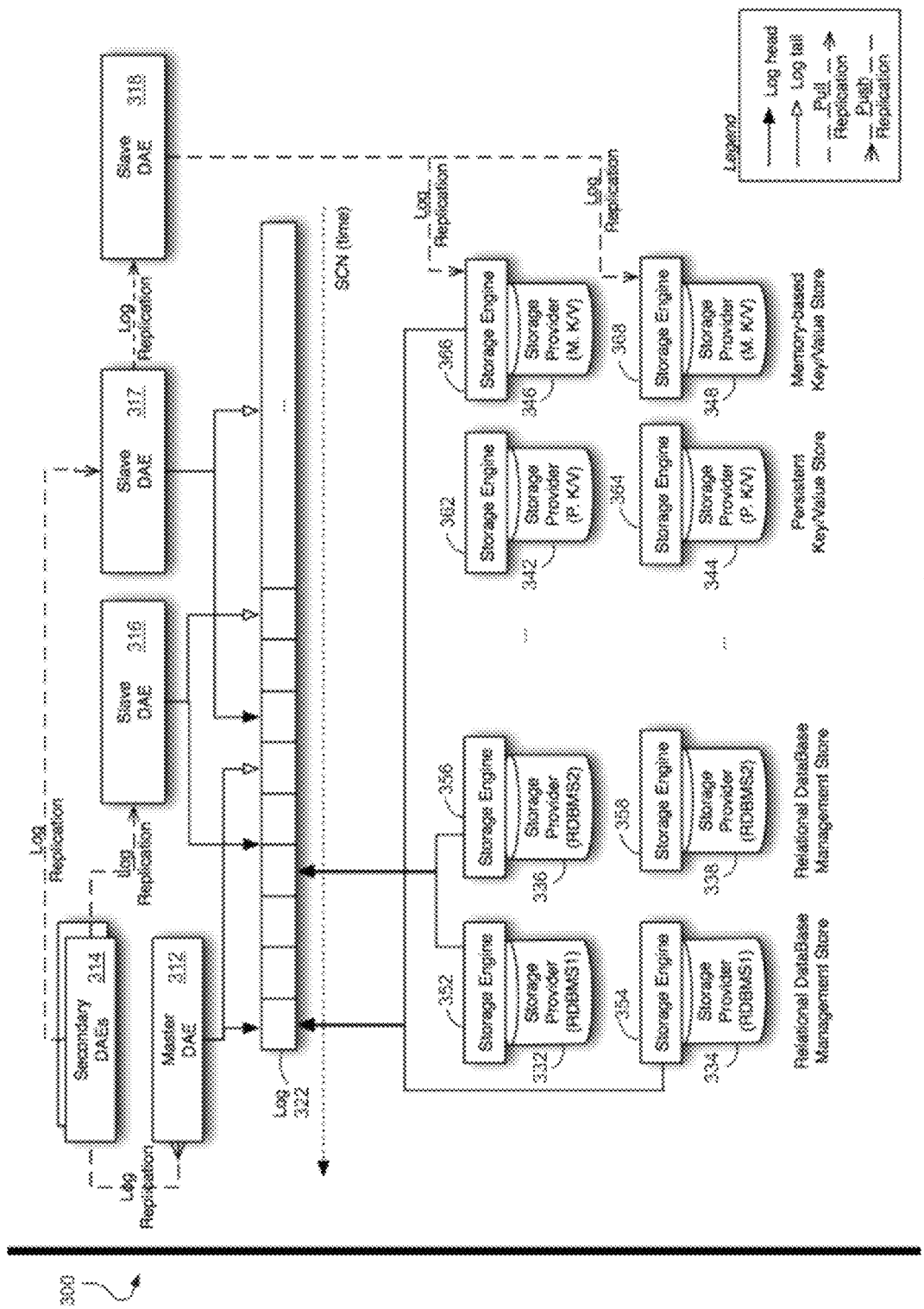
FIG. 3 is a block diagram depicting an example architecture of a multi-tier software system to provide clients with access to data stores.

FIG. 3 is a block diagram depicting an example architecture 300 of a multi-tier software system to provide clients (e.g., clients 122 of FIG. 1) with access to the data store(s) 142. The architecture 300 includes a master DAE instance 312, one or more secondary DAE instances 314, and one or more slave DAE instances 316-318. In example embodiments, the DAE instances 312-318 are configured to cooperate with one another to determine which instance should handle read and write requests that are received from the clients 122. The master DAE instance 312 may handle write requests. This handling may include maintaining a data log 322. The data log 322 may include changes to the data store(s) 142. Each change may be represented by a data change record (DCR) in the data log 322. The DCR is described in more detail below with respect to FIG. 4.

The secondary DAE instances 314 may assist the master DAE instance 312 in ensuring that the data log 322 is durable. Additionally, the secondary DAE instances 314 may handle special read requests (e.g., read requests that specify particular data freshness or data consistency requirements). The slave DAE instances 316 may handle typical read requests (e.g., read requests that are more concerned with the speed at which the data is read than with data freshness or data consistency.)

The architecture 300 includes one or more storage provider instances 332-348. The storage provider instances 332-348 may be of different types. For example, storage provider instances 332 and 334 may be of a first type (e.g., Oracle RDMSs), storage provider instances 336 and 338 may be of a second type (e.g., mySQL RDMSs), storage provider instances 342 and 344 may be of a third type (e.g., persistent key-value storage systems), and storage provider instances 346 and 348 may be of a fourth type (e.g., memory-based key-value storage systems). Each of the storage provider instances may store an instance or a portion (or a partition) of the data store(s) 142. The data store(s) 142 may be partitioned either vertically (e.g., by data source) or horizontally (e.g., by a set of keys).

The architecture 300 includes one or more storage engine instances 352-368, each of which is configured to use a corresponding one of the storage provider instances 332-348 to update (e.g., on a constant basis) at least a portion of an instance of the data store(s) 142 based on changes to the data log 322. Additionally, each of the storage engine instances 352-368 is configured to ensure that the portion of the instance is consistent with a master instance of the data store(s) 142 (e.g., as of the addition by the master DAE instance 312 of a particular DCR to the data log 322).

In the architecture 300, the data log 322 is replicated from the master DAE instance 312 to the secondary DAE instances 314 (e.g., via a push replication mechanism), from the secondary DAE instances 314 to the slave DAE instances 316-317 (e.g., via a pull replication mechanism), from the slave DAE instance 317 to the slave DAE instance 318 (e.g., via a pull replication mechanism), and to the storage engine instances 352-368 (e.g., via a pull replication mechanism).

Because each of the storage engine instances 352-368 may pull changes to the log data at different times, the log heads of various ones of the replications of the data log 322 may correspond to different DCRs of the data log 322. For example, as depicted in FIG. 3, at a particular point in time, the log heads of the replications of the data log 322 maintained by the storage engine instances 356 and 352 correspond to a DCR that is four removed from the log head of the data log 322. In contrast, the log head of the replications of the data log 322 maintained by storage engine instances 354 and 366 correspond to the DCR that is the log head of the data log 322.

The clients 122 are also configured to receive information regarding changes to the data contained in the data layer 140 via the data access layer 130. For example, the clients 122 may be notified by the databus relay layer 222 (FIG. 2) of a change to the data. The clients 122 are also configured to administer and monitor the data contained in the data layer 140 via the data access layer 130. For example, the clients 122 may be configured to monitor changes to the data by calling an API of an administration and monitoring service. The logic layer 120 is communicatively coupled to the data access layer 130. The logic layer 120 may also be communicatively coupled to the data layer 140.

Figure 4:
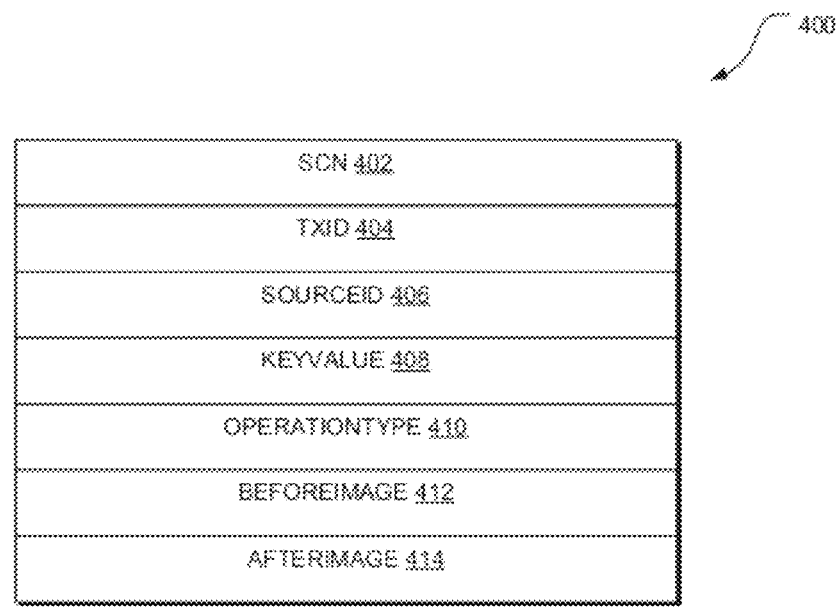
FIG. 4 is a block diagram depicting fields of an example data change record (DCR)

FIG. 4 is a block diagram depicting fields of an example DCR 400. The DCR 400 includes a field 402 (e.g., "SCN") for a system change number that represents the position of the DCR 400 in a data log (e.g., the data log 322). The SCNs corresponding to the DCRs in a data log are, in essence, a clock. In other words, a first DCR representing an older update will have a lower SCN than a second DCR representing a newer update.

The DCR 400 also includes a field 404 (e.g., "TXID") for an identifier of the transaction that the DCR is a part of. A transaction may span multiple DCRs, all of which may be applied atomically. The DCR 400 also includes a field 406 (e.g., "SOURCEID") for an identifier of the data source that is being modified by the DCR. Such data sources may include a base data source (e.g., a database base table) or an index data source (e.g., a database index). Such data sources may be generic base data records or index records, as is described in more detail with respect to FIG. 6 and FIG. 7, respectively.

The DCR 400 also includes a field 408 (e.g., "KEY-VALUE") for a key value corresponding to a data record being updated. The DCR 400 also includes a field 410 (e.g., "OPERATIONTYPE") for a type of operation corresponding to the change. Examples of types of operations include deleting all records associated with the key value (e.g., "DCR_DELETE"), adding a new record associated with the key (e.g., "DCR_INSERT"), and replacing all current data records associated with a new data record (e.g., "DCR_UPDATE"). The replacing operation may be a shortcut for a deletion operation followed by an insertion operation.

The DCR 400 also includes a field 412 (e.g., "BEFOREIMAGE") for the data payload associated with the record before the update. This before image may be absent for insertion operations. The DCR 400 also includes a field 414 (e.g., "AFTERIMAGE") for a data payload associated with the record after the update. This after image may be absent for deletion operations.

Figure 5:
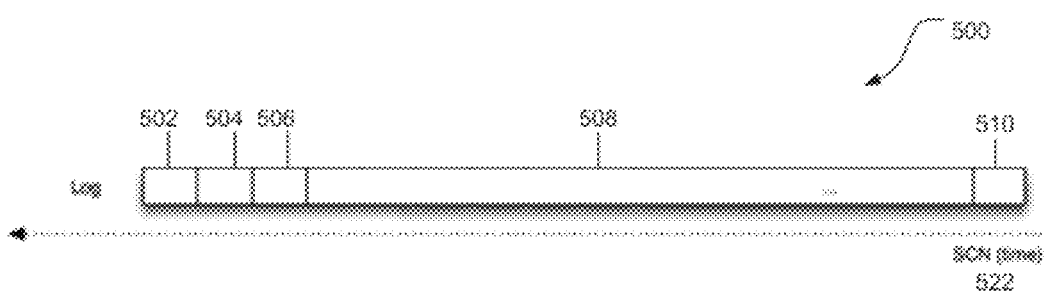
FIG. 5 is a block diagram depicting an example data log.

FIG. 5 is a block diagram depicting an example data log 500. The data log 500 includes DCRs 502-510. The SCN (time) 522 is depicted as flowing from right to left with respect to the data log 500. Therefore, the DCR 510 is at SCN 0 (the beginning of time). The state of a data store to which the data log 500 applies at DCR S is determined by applying all of the DCRs from DCR 510 to DCR S. For example, the state of the data store at DCR 504 is determined by applying all of the DCRs from DCR 510 to DCR 504.

Figure 6:
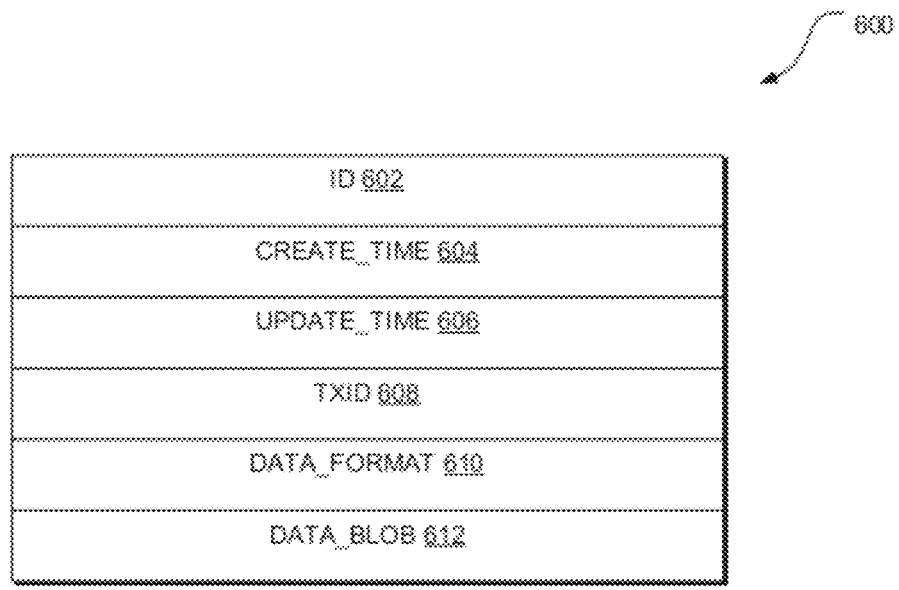
FIG. 6 is a block diagram depicting fields of an example data source to which the source identifier of a DCR may refer.

FIG. 6 is a block diagram depicting fields of an example data source 600 to which the source identifier of a DCR may refer. In various embodiments, the data source 600 is a base data record (e.g., a base database record). The data source 600 includes a field 602 (e.g., "ID") for the primary key of the record. The data source 600 also includes a field 604 (e.g., "CREATE_TIME") for the time at which the record was created. The data source 600 also includes a field 606 (e.g., "UPDATE_TIME") for the time at which the record was updated. The data source 600 also includes a field 608 (e.g., "TXID") for a transaction identifier corresponding to the last update. The data source 600 also includes a field 610 (e.g., "DATA_FORMAT") for a description of the type of data format and a version of the data format. Examples of types of data formats include protobuf, avro, json, and so on. This information allows readers (e.g., storage engines 352-368) to determine how to deserialize a data blob. The data source 600 includes a field 612 (e.g., "DATA_BLOB") for a data payload (or the data blob) corresponding to the DCR.

Figure 7:
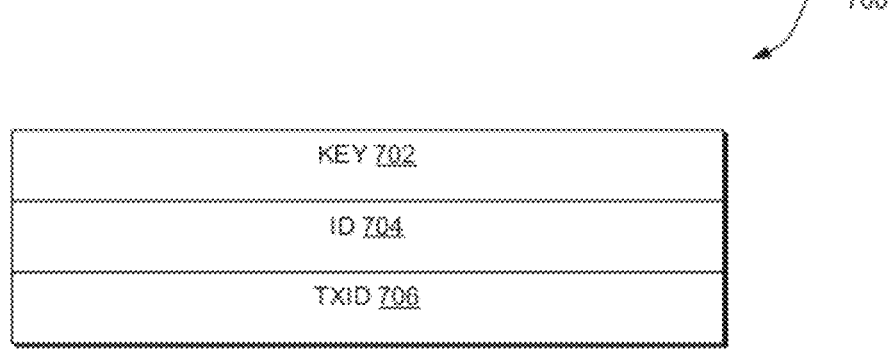
FIG. 7 is a block diagram depicting fields of an example data source.

FIG. 7 is a block diagram depicting fields of an example data source 700. In various embodiments, the data source 700 is an index record (e.g., a database index record). The data source 700 includes a field 702 (e.g., "KEY") for a secondary index key value of the data record. The data source 700 also includes a field 704 (e.g., "ID") for an identifier that is the primary key of the data record. The data source 700 also includes a field 706 (e.g., "TXID") for a transaction identifier corresponding to the last update of the secondary key index value.

Figure 8:
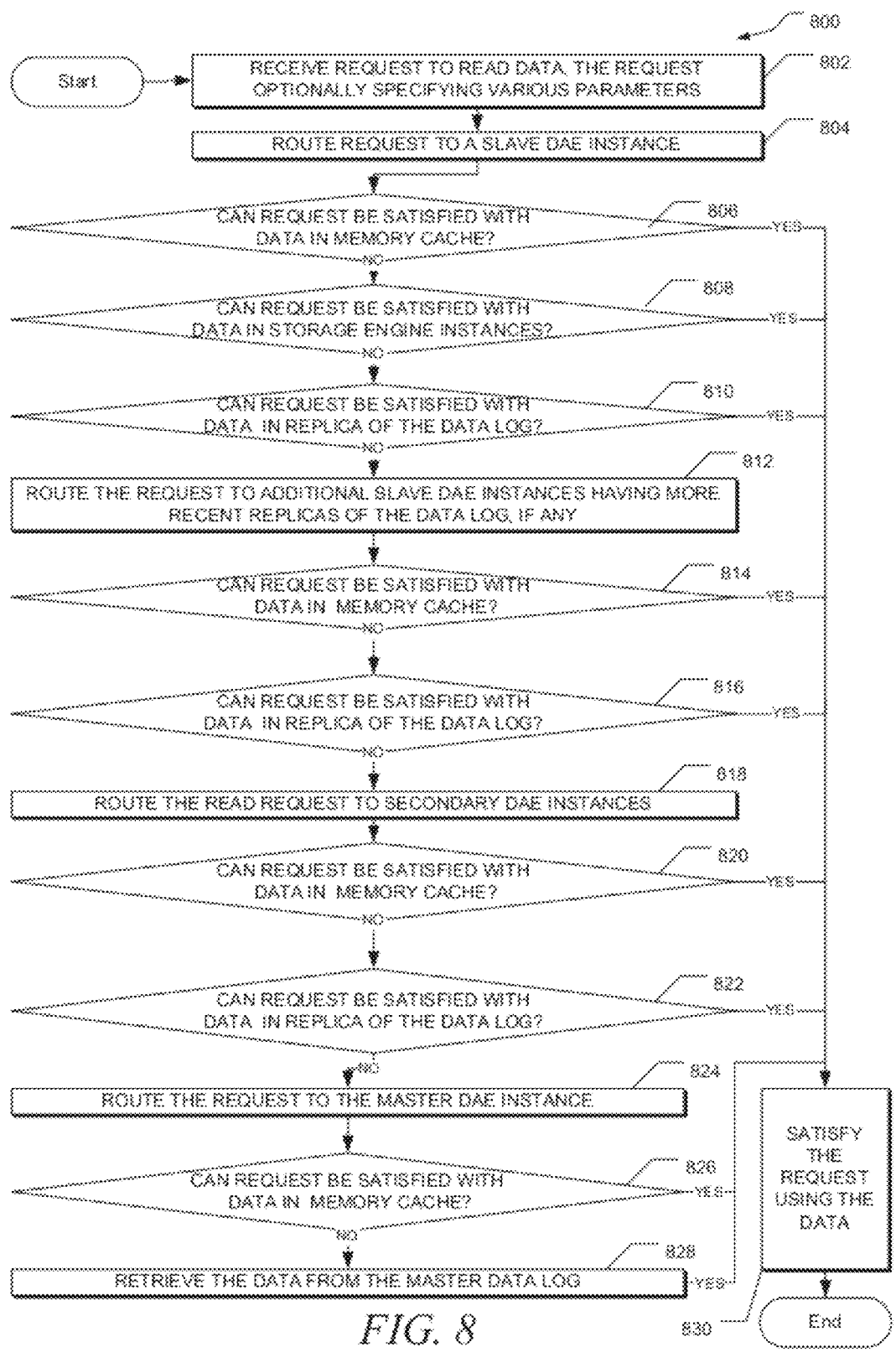
FIG. 8 is a flowchart of an example method of handling a request to read data from a data store.

FIG. 8 is a flowchart of an example method 800 of handling a request to read data from a data store (e.g., the data store(s) 142). At operation 802, the DAE layer 212 receives a request from the clients 122 to read data from the data store(s) 142. For example, the request may be received by the DAE layer 212 as a result of the clients 122 invoking the data service API 204, which, in turn, invokes the client API 214.

The request may specify values of one or more parameters associated with the request. For example, the request may specify a value of a data set, a data key type, a data consistency type, a data recency type, or a latency budget parameter. The value of the data set parameter may specify a particular data set to read from. The value of the data key type parameter may specify the type of key to use to access the data. For example, the value (e.g., "Get-by-Primary-Key") of the data key type parameter may specify that data records are to be accessed by the primary key of the data set. Or the value (e.g., "Get-by-Secondary-Key") of the data key type may specify that the data records are to be accessed by a key in a secondary index for the data set. In this case, the value of the data key type parameter may also include the name of the secondary index to use for the access.

The value (e.g., "Single-Get") of the data consistency type parameter may specify that consistent data records are to be returned across a single key value. In this case, the value of the data consistency type parameter may also include the name of the single key value. In the case of access by primary key or by unique secondary key, the read operation may return at most one data record to which the primary key mapped at a given SCN. In the case of access by secondary key, the read operation may return all records to which the secondary key mapped at a given SCN. Alternatively, the value (e.g., "Multi-Get") of the data consistency type parameter may specify that consistent data records are to be returned across multiple key values. In this case, the value of the data consistency type parameter may also include the set of key values across which consistent data records are to be returned.

The value (e.g., "Get-Any") of the data recency type parameter may specify that consistent data is to be returned as fast as possible and that the recentness (or currency) of the data is not of concern. Or the value (e.g., "Get-After-SCN") of the data recency parameter may specify that consistent data is to be returned that is not older than a given SCN. A typical use case for this is "read your own writes." That is, if an application updates a record at SCN_100, the application should not later read earlier versions of the record (e.g., SCN_78)). Another typical use case is "reader does not regress" (e.g., if an application previously read a data record at SCN_100, the application should not later read a record at SCN_95). In this case, the value of the data recency type parameter may also include the minimum acceptable SCN.

Or the value (e.g., "Get-Recent") of the data recency parameter may specify that the most recent data should be obtained using the latency budget (described below) while, if possible, avoiding contention in the master DAE instance 312.

Or the value (e.g., "Get-Latest") of the data recency parameter may specify that the provably most recent data as of the time of the read request should be obtained. In this case, the master DAE instance 312 may be locked to guarantee that there are no recent updates to the data record that have not been propagated to other components (e.g., the secondary DAE instances 314, the slave DAE instances 316-318, or the storage engine instances 352-368).

The value of the latency budget parameter may specify a maximum time allowed to satisfy the request. The value of the latency budget may be used in conjunction with a value of another parameter (e.g., the "Get-Recent" parameter) to return data that comes as close as possible to matching a requirement without exceeding the maximum time.

At operation 804, the DAE layer 212 routes the request to one of the slave DAE instances 316-318. The DAE slave instances 316-318 may coordinate with one another to determine which DAE slave instance 316-318 handles the request. Alternatively, a routing module (e.g., a dynamic proxy embedded in the data service layer 202) may determine how to route the request. For example, the routing module of the data service layer 202 may specify routing information when calling the client API 214.

At operation 806, the slave DAE instance 316-318 to which the request is routed determines whether it can satisfy the request, according to the parameters of the request, using data in its memory cache. If so, the operations continue at operation 830. Otherwise, the operations continue at operation 808.

At operation 808, the slave DAE instance 316-318 determines whether it can satisfy the request using data in one of the storage engine instances 352-368. For example, the slave DAE instance 316-318 may query (e.g., via an API) the one or more of the storage engine instances 352-368 for their most recent copies of the data. If the slave DAE instance 316-318 can satisfy the request using the data in one of the storage engine instances 352-368, the operations continue at operation 830. Otherwise, the operations continue at operation 810.

At operation 810, the slave DAE instance 316-318 determines whether it can satisfy the request using data in its replica of the data log 322. If so, the operations continue at operation 830. Otherwise, the operations continue at operation 812.

At operation 812, the DAE layer 212 routes the request to one or more additional ones of the slave DAE instances 316-318. For example, the DAE layer 212 may route the request to a DAE instance that has a more recent replica of the data log 322 than the DAE instance 316-318 to which the request was originally routed. The DAE layer 212 may determine whether one of the additional DAE instances has a more recent replica of the data log 322 by comparing the SCNs of the DCRs at the head ends of the replicas.

At operation 814, each of the additional slave DAE instances to which the request is routed determines whether it can satisfy the request with data in its memory cache. If so, the operations continue at operation 830. Otherwise, the operations continue at operation 816.

At operation 816, each of the additional slave DAE instances determines whether it can satisfy the request with data in its replica of the data log 322. If so, the operations continue at operation 830. Otherwise, the operations continue at operation 818.

At operation 818, the DAE layer 212 routes the request to one or more of the secondary DAE instances 314.

At operation 820, each of the one or more secondary DAE instances 314 to which the request is routed determines whether it can satisfy the request using data in its memory cache. If so, the operations continue at operation 830. Otherwise, the operations continue at operation 822.

At operation 822, each of the one or more secondary DAE instances 314 determines whether it can satisfy the request using data in its replica of the data log 322. If so, the operations continue at operation 830. Otherwise, the operations continue at operation 824.

At operation 824, the DAE layer 212 routes the request to the master DAE instance 312.

At operation 826, the master DAE instance 312 determines whether it can satisfy the request with data in its memory cache. If so, the operations continue at operation 830. Otherwise, the operations continue at operation 828.

At operation 828, the master DAE instance 312 retrieves the data from the master data log.

At operation 830, the request is satisfied using the identified data.

Accordingly, for a "Get-Any" request, the read sequence is terminated at the first step at which there is consistent data for all read keys. For "Get-After-SCN" requests, the read sequence is terminated at the first step at which there is consistent data for all read keys as of an SCN that is not older than the SCN specified in the read request. For "Get-Recent" requests, the original slave DAE instance will attempt to get the most recent data by contacting other slave DAE instances before contacting the master or secondary DAE instances. For "Get-Latest" requests, the request always reaches the master DAE instance because the freshness of the data must be verified before the data can be returned. In this case, the original slave DAE instance may skip operations 812-822 if it determines that the head of its replica of the data log is sufficiently close to the head of the master data log.

Figure 9:
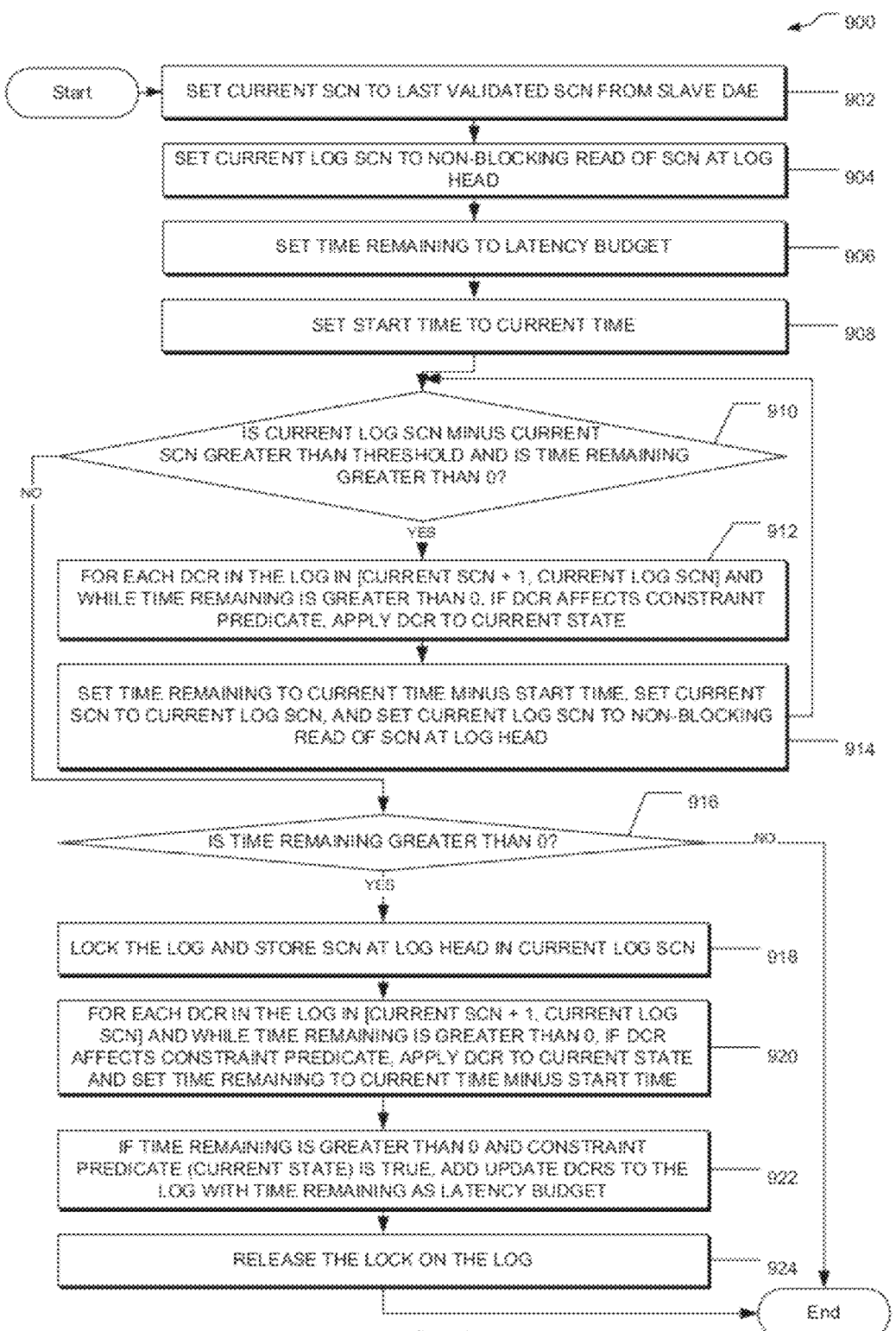
FIG. 9 is a flow chart of an example method to validate constraints associated with reading data from a data store.

FIG. 9 is a flow chart of an example method to validate constraints associated with reading data from a data store (e.g., data store(s) 142). Some examples of constraints were described above with respect to FIG. 8. An additional example of a constraint is that there are to be no updates to a key K from SCN S' to SCN S", where S' represents a first state of the data store and S" represents a second (later) state of the data store. This kind of constraint can be used to ensure that the value of K read at S' is the most recent one as of S". Another example of a constraint is that there are to be no inserts or updates with key value K after SCN S. This kind of constraint can be used for validation of unique index constraints. The DAE layer 212 may ensure (e.g., via a DAE instance) that a unique index does not already contain the key value K by verifying that the index did not contain K at a recent SCN S and that no inserts or updates were applied with that value after S.

Constraints may be of two types: non-blocking constraints and blocking constraints. A non-blocking constraint is a constraint that does not require the master data log (e.g., data log 322) to be locked. An example of a non-blocking constraint is the "Get-Latest" constraint described above with respect to FIG. 8. In this case, the SCN corresponding to the request is pre-determined at the time the read request was received. For example, an SCN that is sought may be the SCN at the current head of the log in the master DAE instance 312 or the secondary DAE instances 314. For such constraints, no lock on the master log is needed since the upper bound does not change after the request is received. As described above with respect to FIG. 8, the validation of non-blocking constraints may be reduced to reading the key values at the upper bound SCN and evaluating the constraint predicate. Such constraints are generally validated by the slave DAE instances 316-318 or the secondary DAE instances 314 to decrease the load on the master DAE instance 312.

A blocking constraint is a constraint that requires the master data log to be locked. An example of such a constraint is an update to a field associated with a unique secondary index. Such constraints may be finally enforced by the master DAE instance 312 because the master DAE instance 312 may be the only component of the data access engine layer 212 that updates the master data log. The validation of blocking constraints may start at the slave DAE instances 316-318 or secondary DAE instances 314, but may be finalized at the master DAE instance 312.

The master DAE instance 312 may receive the following values as input (e.g., from a slave DAE instance or a secondary DAE instance): a last validated SCN, a latency budget (e.g., a maximum time to perform the validation), a constraint predicate (e.g., the constraint to verify), a current state (e.g., values of keys relevant to the constraint predicate), and update DCRs (e.g., DCRs to update based on the constraint). The master DAE instance 312 may output an exit status (e.g., a success value or a failure value). Further-more, in the case of success, the master DAE instance 312 may return update DCRs that have been added to the data log at the update SCN.

At operation 902, the master DAE instance 312 sets a current SCN equal to a last validated SCN from a slave DAE.

At operation 904, the master DAE instance 312 sets a current log SCN equal to the SCN at the head of the master data log. Here, the master DAE instance may obtain the head of the master data log using a non-blocking read request.

At operation 906, the master DAE instance 312 sets a time remaining equal to the latency budget. Here, the latency budget may have been provided as a parameter of the read request.

At operation 908, the master DAE instance 312 sets a start to equal to the current time.

At operation 910, the master DAE instance 312 determines whether the current log SCN minus the current SCN is greater than a threshold and whether the time remaining is greater than 0. If so, the operations continue at operation 912. Otherwise, the operations continue at operation 916.

At operation 912, for each DCR in the data log between current SCN+1 and current log SCN and while the time remaining is greater than 0, if the DCR affects the constraint predicate, the master DAE instance 312 applies the DCR to the current state.

At operation 914, if the time remaining is greater than 0, the master DAE instance 312 sets the time remaining to the current time minus the start time, sets the current SCN to the current log SCN, and sets the current log SCN to the SCN at the master log head. Here, again, the master DAE instance 312 may determine the SCN at the head of the master log by performing a non-blocking read of the SCN of the DCR at the head of the master log.

At operation 916, if the time remaining is greater than 0, the operations continue at operation 918. Otherwise, the operations end with an error value.

At operation 918, the master DAE instance 312 locks the master data log and stores the SCN of the DCR at the log head of the master log in the current log SCN.

At operation 920, for each DCR in the log between the current SCN+1 and the current log SCN and while the time remaining is greater than 0, if the DCR affects the constraint predicate, the master DAE instance 312 applies the DCR to the current state and sets the time remaining to the current time minus the start time.

At operation 922, if the time remaining is greater than 0 and the constraint predicate (of the current state) is true, the master DAE instance 312 adds the update DCRs to the master data log. The update may also be replicated to a pre-determined minimum number of secondary DAE instances 314 to guarantee durability of the update.

At operation 924, the master DAE instance 312 releases the lock on the log. The operation may end with a success value if the update to the master log succeeded. Otherwise, the operation may end with an error value.

Figure 10:
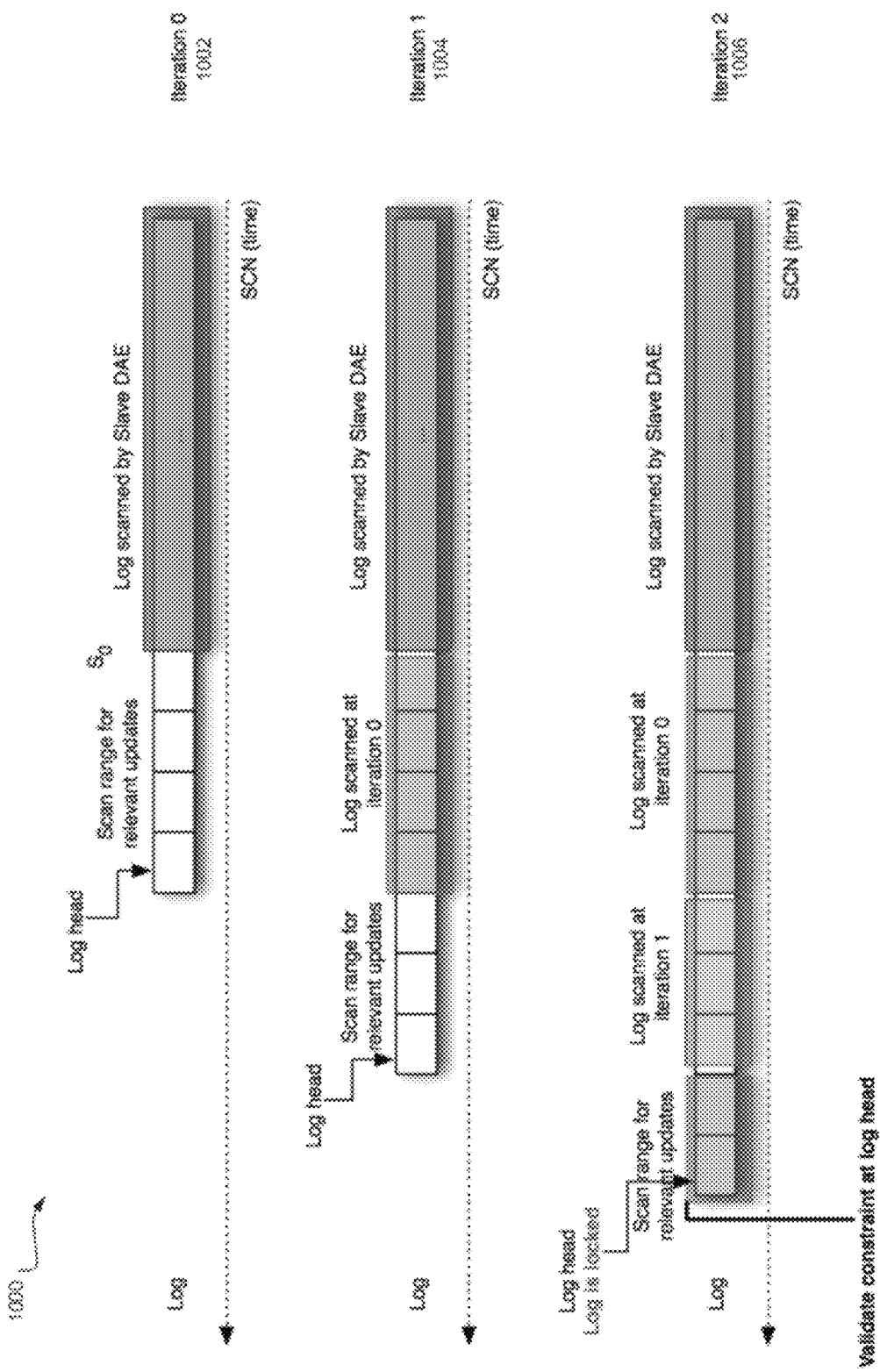
FIG. 10 is a block diagram depicting an example result of an execution of the method of FIG. 9.

FIG. 10 is a block diagram depicting an example result 1000 of an execution of the method of FIG. 9. At iteration 0 1002, the master DAE instance 312 has identified a scan range for updates relevant to a read request. The relevant scan range is between a state S0, which was the latest SCN of the replica of the data log scanned by a slave or a secondary DAE instance, and the current head of the master log. At iteration 1 1004, the master DAE instance 312 has scanned the scan relevant scan range as identified at operation 0 1002; however, three new DCRs have also been added to the master log, thereby extending the relevant scan range.

At iteration 2 1006, the master DAE instance 312 has scanned the additional three DCRs added to the master log at iteration 2 1004. Furthermore, two additional DCRs have been added to the master data log. Here, the master DAE instance 312 has determined that the remaining portion of the data log is smaller than a pre-determined threshold and has locked the master data log to validate the constraint at the head of the master log. As depicted in FIG. 10, the iterations 1002-1006 result in a convergence of the relevant scan range and the scanned portion of the log because the master DAE instance 312 scans the log at a faster rate than updates to the master log are propagated to the secondary DAE instances 314.

FIG. 11 is a table 1100 of example information upon which the master DAE instance 312 may base the generation of a DCR for addition to the master log. A write operation may specify a data source, a key value, an update type, a new value, and a latency budget.

The data source may be a logical record (e.g., a data source having a structure depicted in FIG. 6 or FIG. 7) that corresponds to one or more physical records. Thus, a single write operation affecting a single data source may affect multiple physical records. For example, an update of a logical data source having two secondary indexes may result in up to five physical records being updated. First, an old record may be deleted from a physical data source corresponding to the first secondary index. Second, an old record may be deleted from a physical data source corresponding to the second secondary index. Third, a physical record of a base data source record may be updated. Fourth, a new record may be inserted in a physical data source corresponding to the first secondary index. Fifth, a new record may be inserted in a physical data source corresponding to the second secondary index.

The master DAE instance 312 may ensure (e.g., via the storage engine layer 232) the atomicity of the writes to the logical record. For example, the application may always use an "autocommit" mode of the storage providers 332-348 when writing to the underlying physical records. As used herein, "autocommit" is a mode of operation of a database connection in which each individual database interaction is executed in its own transaction that is implicitly committed.

The durability of the log is ensured through the replication of the log from the master DAE instance 312 to the secondary DAE instances 314. The log replication from the master DAE instance 312 to the secondary DAE instances 314 is synchronous through a push from the master DAE instance 312 to the secondary DAE instances 314. The update may not succeed until a certain durability policy is satisfied. For example, one policy might specify that at least W out of the N secondary DAE instances 314 must confirm the durability of the new log DCRs. Another policy might specify that at least W0 writes to a local instance of the data store must succeed, W1 writes to a remote instance of the data store must succeed, and W2 writes to another remote instance of the data store must succeed.

The key value is the primary key value of the record being updated.

The update type is the type of the update. For example, the update type may be an insertion (e.g., "INSERT") that adds a new key/value and fails if the key exists. The update type may be an update (e.g., "UPDATE") that updates an existing value and fails if the key does not exist. The update type may be a deletion (e.g., "DELETE") that deletes a key/value pair and fails if the key does not exist. The update type may be a combination of an insertion and an update (e.g., "UPSERT") that inserts a new key/value pair or updates an existing key value pair to a specified value.

The new value is a new value to associate with the key. The new value may be ignored for deletion operations.

The latency budget, as described above, is the maximum time allowed to find a result.

Each write operation may be associated with one or more consecutive DCRs in the master data log. All of those DCRs would share the same transaction identifier. Which DCRs are generated is determined by the type of the update operation and the existence of secondary indexes. As depicted in FIG. 11, the generation of DCRs is associated with asserts on the validity of blocking constraints and the resolves on the existing values of the keys. The table 1100 may be extended to cases with more than one index (unique or non-unique).

Figure 12:
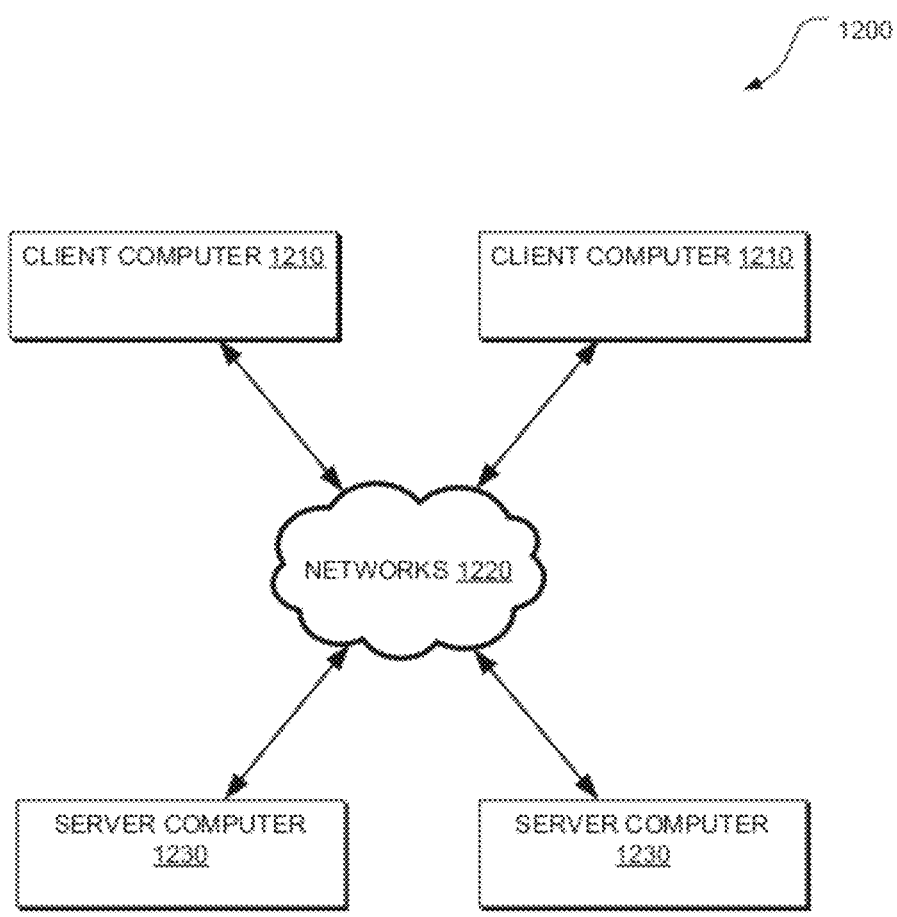
FIG. 12 is a block diagram of an example hardware architecture on which the layers of a multi-tier software application may be configured to execute.

FIG. 12 is a block diagram of an example hardware architecture 1200 on which the layers 100 of a multi-tier software application may be configured to execute. The hardware architecture 1200 includes one or more computers. The computers may be client computers 1210 or server computers 1230. An example computer is described below with respect to FIG. 13. The computers are connected to each other via one or more networks 1220. Examples of the networks 1220 include local area networks (LANs), wide area network (WANs), and global area network (GANs) (e.g., the Internet). In example embodiments, the presentation layer 110, the logic layer 120, the data access layer 130, and the data layer 140 are configured to be distributed across multiple software servers executing on multiple server computers 1230.

Figure 13:
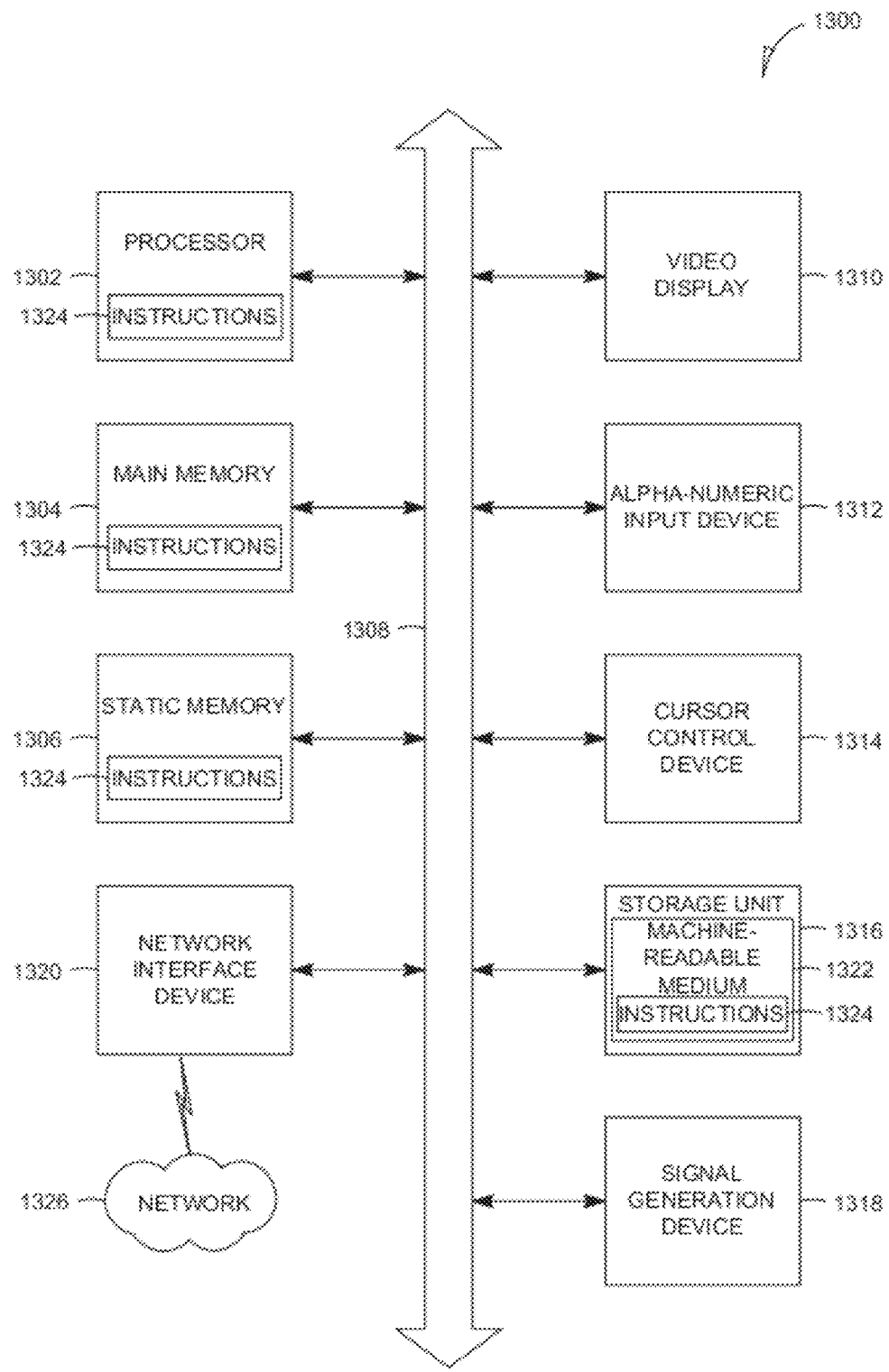
FIG. 13 is a block diagram of a machine within which instructions for causing the machine to perform any one or more of the methodologies discussed herein may be executed.

FIG. 13 is a block diagram of a machine in the example form of a computer system 1300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a storage unit 1316, a signal generation device 1318 (e.g., a speaker) and a network interface device 1320.

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1324 may further be transmitted or received over a communications network 1326 using a transmission medium. The network 1326 may be one of the networks 1220. The instructions 1324 may be transmitted using the network interface device 1320 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Figure 14:
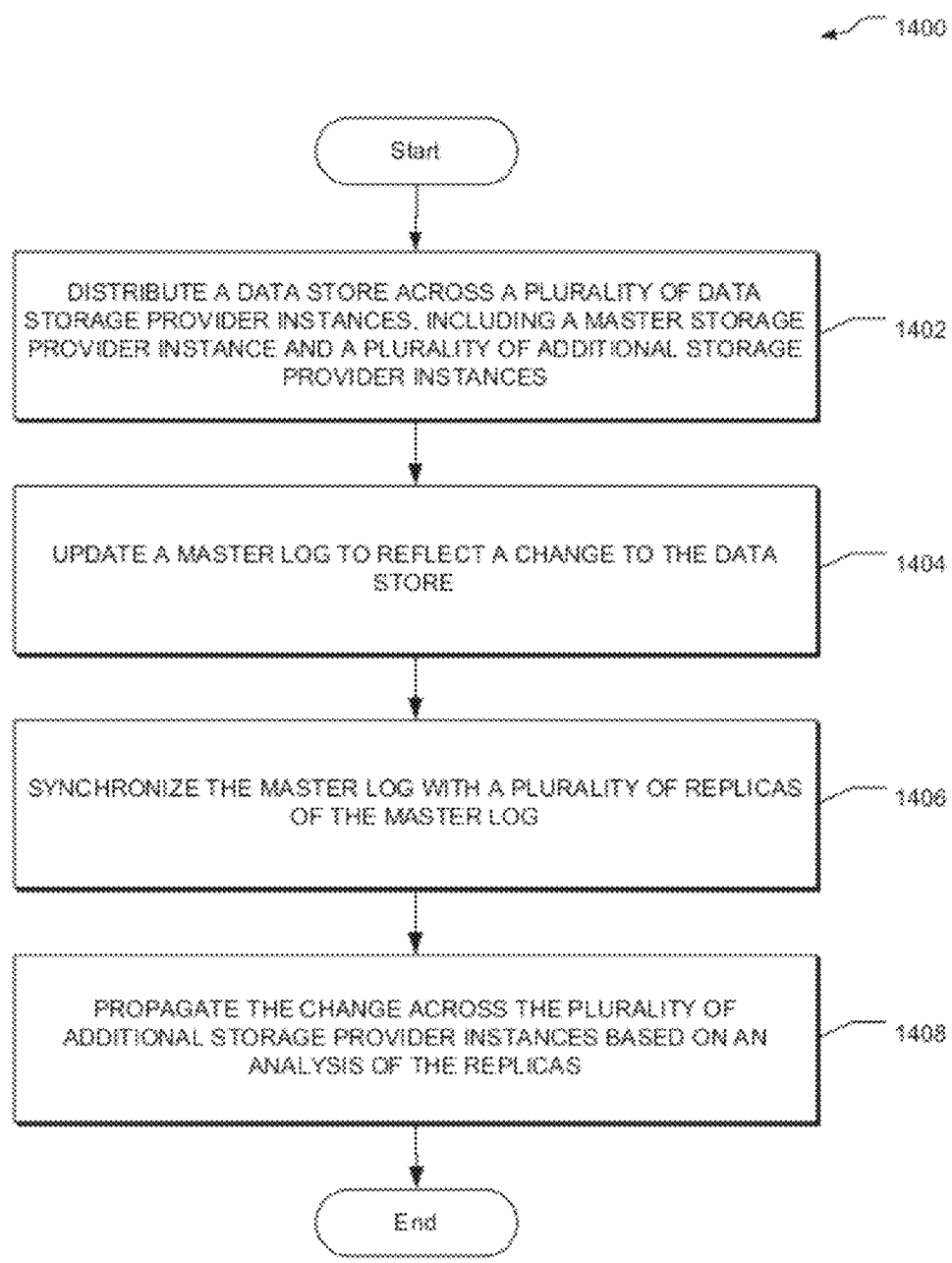
FIG. 14 is a flowchart of an example method of propagating a change to a data store across a plurality of data store instances and a plurality of additional data store instances.

FIG. 14 is a flowchart of an example method 1400 of propagating a change to a data store across a plurality of data store instances and a plurality of additional data store instances. At operation 1402, the data layer 140 distributes a data store across a plurality of storage provider instances. The plurality of storage provider instances may include a master storage provider instance and a plurality of additional storage provider instances.

At operation 1404, the data access engine layer 212 updates a master log to reflect a change to the data store. The updating of the master log may include inserting a data change record into the master log. The data change record may have a data model that is independent of a plurality of data models used by a plurality of additional storage provider instances. The data change record may include a reference to a data source record. The data source record may include a field corresponding to a data format and a field corresponding to a data blob. The data format may enable a plurality of storage engine instances associated with the plurality of additional storage provider instances to deserialize the blob. The master log may be maintained by a master data access engine instance. Additionally, the master data access engine instance may be associated with the master storage provider instance.

At operation 1406, the data access engine layer 212 synchronizes the master log with a plurality of replicas of the master log. Each of the plurality of replicas may be maintained by a respective one of the plurality of additional data access engine instances. Additionally, each of the plurality of additional data access engine instances may be associated with a respective one of the plurality of additional storage provider instances. Here, a first one of the plurality of storage provider instances and the plurality of additional storage provider instances may have a first type and a second one of the plurality of storage provider instances and the plurality of additional storage provider instances may have a second type. Examples of types of storage provider instances include relational database management stores, persistent key-value stores, and memory-based key-value stores.

At operation 1408, the data access engine layer 212, analyzes the replicas to propagate the change across the plurality of additional storage provider instances.

Figure 15:
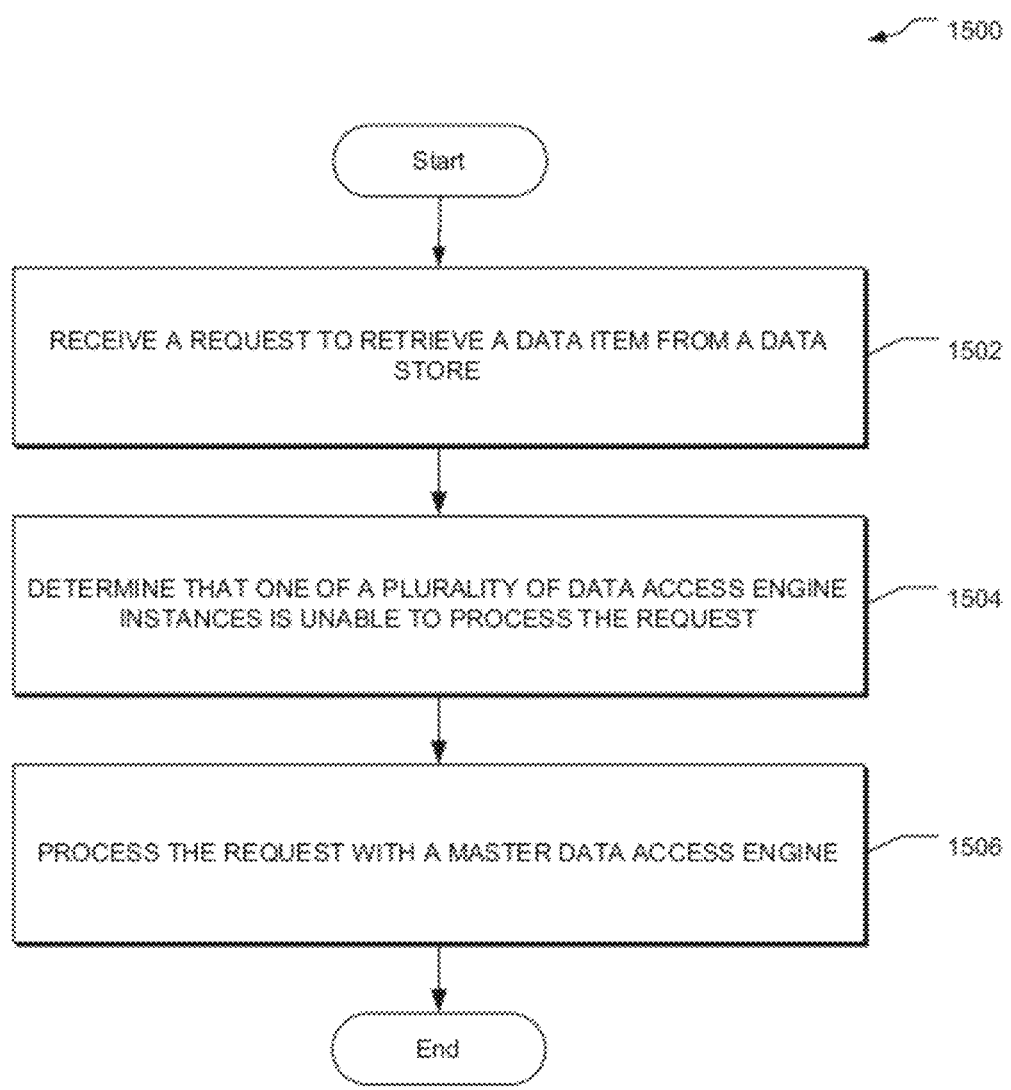
FIG. 15 is a flowchart of an example method of processing a request to retrieve a data store item from a data store with a master data access engine.

FIG. 15 is a flowchart of an example method 1500 of processing a request to retrieve a data store item from a data store with a master data access engine. At operation 1502, the data access layer 130 receives a request to retrieve a data item from a data store. The data store may be distributed across a plurality of storage provider instances. The plurality of storage provider instances may include a master storage provider instance and a plurality of additional storage provider instances. The master storage provider instance may be associated with a master data access engine instance. The plurality of additional storage provider instances may be associated with a plurality of additional data access engines. The master data access engine may maintain a master data log. Each of the plurality of additional data access engines may maintain a respective one of a plurality of replicas of the master data log. The request may specify a minimum freshness level or a latency budget.

At operation 1504, the data access layer 130 determines that one of the plurality of data access engine instances is unable to process the request. The data access layer 130 may base the determination on an analysis of the one of the plurality of replicas maintained by the one of the plurality of data access engine instances.

At operation 1506, the data access layer 130 processes the request with the master data access engine. The processing of the request may be based on an analysis of the master data log. For example, the analysis may indicate that the data item has less than the minimum freshness level with respect to the one of the plurality of additional storage provider instances that is associated with the one of the plurality of data access engine instances. Or the processing may be based on the latency budget not being expended. Additionally, the processing of the request may be based on the determination at operation 1504 that one of the plurality of data access engine instances is unable to process the request. The processing of the request with the master data access engine may include receiving a constraint to verify, performing iterative scans of the data change records in the master data log until a number of unscanned data change records is smaller than a pre-determined threshold, locking the master data log to scan the unscanned data change records, and verifying the constraint at the head of the master log.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of decreasing load on a master data access engine instance, the method comprising:
    distributing a data store across a plurality of storage provider instances;
    updating a master log to reflect a change to the data store, the master log being maintained by the master data access engine instance;
    synchronizing the master log with a plurality of replicas of the master log, each of the plurality of replicas being maintained by a respective one of a plurality of secondary data access engine instances, the synchronizing of the master log with the plurality of replicas of the master log including using a push replication mechanism, the synchronizing of the master log with the plurality of replicas of the master log being performed by a machine;
    synchronizing the plurality of replicas of the master log with a plurality of additional replicas of the master log, each of the plurality of additional replicas being maintained by a respective one of a plurality of slave data access engine instances, the synchronizing of the plurality of replicas of the master log including using a pull replication mechanism;
    selecting one of the master log, the plurality of replicas of the master log, and the plurality of additional replicas of the master log to use in propagating the change to one of the plurality of storage provider instances, the selecting based on a constraint specified in a request received from the one of the plurality of storage provider instances, the constraint including at least one of a speed, freshness, or consistency requirement; and
    processing the request at the master data access engine instance, the processing of the request including:
        performing iterative scans of data change records in the master log until a number of unscanned data change records is smaller than a pre-determined threshold;
        locking the master log to scan the unscanned data change records; and
        verifying the constraint at the head of the master log.

2. The method of claim 1, wherein a first one of the plurality of storage provider instances has a first type and a second one of the plurality of storage provider instances has a second type.

3. The method of claim 2, wherein the first type is one of a relational database management store, a persistent key-value store, and a memory-based key-value store.

4. The method of claim 1, wherein the updating of the master log to reflect the change includes inserting a data change record into the master log, the data change record having a data model that is independent of a plurality of data models used by the plurality of storage provider instances.

5. The method of claim 1, further comprising determining a success of the synchronizing of the master log with the plurality of replicas of the master log based on a durability policy, the durability policy specifying a fraction of the plurality of secondary data access engine instances that must confirm durability of the plurality of replicas of the master log.

6. A method of decreasing load on a master data access engine instance, the method comprising:
    receiving a request to retrieve a data item from a data store, the data store being distributed across a plurality of storage provider instances, the plurality of storage provider instances being associated with a plurality of data access engine instances, the plurality of data access engine instances including the master data access engine instance, a plurality of secondary data access engine instances, and a plurality of slave data access engine instances, the master data access engine instance maintaining a master data log, and the plurality of secondary data access engine instances and slave data access engine instances maintaining a plurality of replicas of the master data log, the request specifying a constraint pertaining to the retrieving of the data item;
    routing the request to one of the slave data access engine instances;
    based on a determination that the one of the slave data access engine instances is unable to process the request, the determination based on an analysis of one of the plurality of replicas of the master data log maintained by the one of the slave data access engine instances with respect to the constraint, routing the request to one of the secondary data access engine instances;
    based on a determination that the one of the secondary data access engine instances is unable to process the request, the determination based on an analysis of one of the plurality of replicas of the master data log maintained by the one of the secondary data access engine instances with respect to the constraint, routing the request to the master data access engine instance; and
    processing the request at the master data access engine instance, the processing of the request including:
        performing iterative scans of data change records in the master data log until a number of unscanned data change records is smaller than a pre-determined threshold;

locking the master data log to scan the unscanned data change records; and verifying the constraint at the head of the master log.

7. The method of claim 6, wherein the constraint specifies a minimum freshness level and the determination that the one of the slave data access engine instances is unable to process the request is based on a replica of the plurality of replicas of the master data log corresponding to the one of the slave data access engine instances having less than the minimum freshness level.

8. The method of claim 6, wherein the constraint specifies a latency budget and the determination that the one of the slave data access engine instances is unable to process the request is based on the one of the slave data access engine instances being unable to process the request within the latency budget.

9. A system of decreasing load on a master data access engine instance, the system comprising:

one or more modules implemented by one or more processors, the one or more modules configured to:

distribute a data store across a plurality of storage provider instances;

update a master log to reflect a change to the data store, the master log being maintained by a master data access engine instance;

synchronize the master log with a plurality of replicas of the master log, each of the plurality of replicas being maintained by a respective one of a plurality of secondary data access engine instances, the synchronizing of the master log with the plurality of replicas of the master log including using a push replication mechanism, the synchronizing of the master log with the plurality of replicas of the master log being performed by a machine; and synchronize the plurality of replicas of the master log with a plurality of additional replicas of the master log, each of the plurality of additional replicas being maintained by a respective one of a plurality of slave data access engine instances, the synchronizing of the plurality of replicas of the master log including using a pull replication mechanism;

select one of the master log, the plurality of replicas of the master log, and the plurality of additional replicas of the master log to use to propagate the change across the plurality of storage provider instances, the selecting based on a constraint specified in a request received from the one of the plurality of storage provider instances, the constraint including at least one of a speed, freshness, or consistency requirement; and processing the request at the master data access engine instance, the processing of the request including:

performing iterative scans of data change records in the master log until a number of unscanned data change records is smaller than a pre-determined threshold;

locking the master log to scan the unscanned data change records; and verifying the constraint at the head of the master log.

10. The system of claim 9, wherein a first one of the plurality of storage provider instances has a first type and a second one of the plurality of storage provider instances has a second type.

11. The system of claim 10, wherein the first type is one of a relational database management store, a persistent key-value store, and a memory-based key-value store.

12. The system of claim 9, wherein the updating of the master log to reflect the change includes inserting a data change record into the master log, the data change record having a data model that is independent of a plurality of data models used by the plurality of storage provider instances.

13. The system of claim 12, wherein the data change record includes a reference to a data source record, the data source record including a field corresponding to a data format and a field corresponding to a data blob, the data format enabling each of the plurality of storage provider instances to deserialize the blob.

14. A system of decreasing load on a master data access engine instance, the system comprising:

one or more modules implemented by one or more processors, the one or more modules configured to:

receive a request to retrieve a data item from a data store, the data store being distributed across a plurality of storage provider instances, the plurality of storage provider instances being associated with a plurality of data access engine instances, the plurality of data access engine instances including the master data access engine instance, a plurality of secondary data access engine instances, and a plurality of slave data access engine instances, the master data access engine instance maintaining a master data log, and the plurality of secondary data access engine instances and slave data access engine instances maintaining a plurality of replicas of the master data log, the request specifying a constraint pertaining to the retrieving of the data item;

route the request to one of the slave data access engine instances;

based on a determination that the one of the slave data access engine instances is unable to process the request, the determination based on an analysis of one of the plurality of replicas of the master data log maintained by the one of the slave data access engine instances with respect to the constraint, route the request to one of the secondary data access engine instances; and based on a determination that the one of the secondary data access engine instances is unable to process the request, the determination based on an analysis of one of the plurality of replicas of the master data log maintained by the one of the secondary data access engine instances with respect to the constraint, route the request to the master data access engine instance; and processing the request at the master data access engine instance, the processing of the request including:

performing iterative scans of data change records in the master data log until a number of unscanned data change records is smaller than a pre-determined threshold;

locking the master data log to scan the unscanned data change records; and verifying the constraint at the head of the master data log.

15. The system of claim 14, wherein the constraint specifies a minimum freshness level and the determination that the one of the slave data access engine instances is unable to process the request is based on a replica of the plurality of replicas of the master data log corresponding to the one of the slave data access engine instances having less than the minimum freshness level.

16. The system of claim 14, wherein the constraint specifies a latency budget and the determination that the one of the slave data access engine instances is unable to process the request is based on the one of the slave data access engine instances being unable to process the request within the latency budget.

17. A non-transitory machine readable medium embodying a set of instructions that, when executed by a processor, cause the processor to perform operations, the operations comprising:
  distributing a data store across a plurality of storage provider instances;
  updating a master log to reflect a change to the data store, the master log being maintained by the master data access engine instance;
  synchronizing the master log with a plurality of replicas of the master log, each of the plurality of replicas being maintained by a respective one of a plurality of secondary data access engine instances, the synchronizing of the master log with the plurality of replicas of the master log including using a push replication mechanism;
  synchronizing the plurality of replicas of the master log with a plurality of additional replicas of the master log, each of the plurality of additional replicas being maintained by a respective one of a plurality of slave data access engine instances, the synchronizing of the plurality of replicas of the master log including using a pull replication mechanism;
  selecting one of the master log, the plurality of replicas of the master log, and the plurality of additional replicas of the master log to use in propagating the change to one of the plurality of storage provider instances, the selecting based on a constraint specified in a request received from the one of the plurality of storage provider instances, the constraint including at least one of a speed, freshness, or consistency requirement; and
  processing the request at the master data access engine instance, the processing of the request including:
    performing iterative scans of data change records in the master log until a number of unscanned data change records is smaller than a pre-determined threshold;
    locking the master log to scan the unscanned data change records; and
    verifying the constraint at the head of the master log.

18. A non-transitory machine readable medium embodying a set of instructions that, when executed by a processor, cause the processor to perform a method, the method comprising:
  receiving a request to retrieve a data item from a data store, the data store being distributed across a plurality of storage provider instances, the plurality of storage provider instances being associated with a plurality of data access engine instances, the plurality of data access engine instances including the master data access engine instance, a plurality of secondary data access engine instances, and a plurality of slave data access engine instances, the master data access engine instance maintaining a master data log, and the plurality of secondary data access engine instances and slave data access engine instances maintaining a plurality of replicas of the master data log, the request specifying a constraint pertaining to the retrieving of the data item;
  routing the request to one of the slave data access engine instances;
  based on a determination that the one of the slave data access engine instances is unable to process the request, the determination based on an analysis of one of the plurality of replicas of the master data log maintained by the one of the slave data access engine instances with respect to the constraint, routing the request to one of the secondary data access engine instances;
  based on a determination that the one of the secondary data access engine instances is unable to process the request, the determination based on an analysis of one of the plurality of replicas of the master data log maintained by the one of the secondary data access engine instances with respect to the constraint, routing the request to the master data access engine instance; and
  processing the request at the master data access engine instance, the processing of the request including:
    performing iterative scans of data change records in the master data log until a number of unscanned data change records is smaller than a pre-determined threshold;
    locking the master data log to scan the unscanned data change records; and
    verifying the constraint at the head of the master data log.

* * * * *